UNITED STATES PATENT OFFICE.

CARL GRUNZWEIG AND PAUL HARTMANN, OF LUDWIGSHAFEN, GERMANY.

ARTIFICIAL CORK.

SPECIFICATION forming part of Letters Patent No. 275,904, dated April 17, 1883.

Application filed March 2, 1883. (No specimens.)

*To all whom it may concern:*

Be it known that we, CARL GRUNZWEIG and PAUL HARTMANN, subjects of the Emperor of Germany, residing at Ludwigshafen, near Mannheim, Germany, have invented new and useful Improvements in Artificial Cork, of which the following is a specification.

The object of our invention is to provide a new and improved artificial cork which can be used for manufacturing various articles which are to be light and to have non-conducting properties.

In carrying out our invention 6.3 kilograms (about 13.15 ounces) of powdered cork, in pieces of from two to four millimeters (one-twelfth to one-sixteenth of an inch) in size, are mixed in boiling-hot paste composed of three kilograms (six and one-half pounds) of starch and twenty-five kilograms (fifty-five pounds) of boiling-hot water; or the starch can first be mixed with the pulverized cork and then the boiling water added, and the mass is then thoroughly kneaded and mixed. The plastic mass thus formed must be shaped at once, either by being filled into molds and then pressed, or by being forced through a suitable mouth-piece. The articles formed of the above-described artificial cork are immediately placed in a drying-room at a very high temperature and are dried. A temperature of 100° centigrade (212° Fahrenheit) is the best. The drying takes place very slowly, and with objects of a thickness of twenty millimeters (three-fourths of an inch) the drying operation lasts about two days. If the objects are not immediately placed in the drying-room and are exposed to the action of the air a short time before being dried, they begin to crack and are defaced by blisters as soon as they are placed in the hot room.

In place of using starch, any other suitable material containing starch or having like binding properties can be used. If the articles produced are to be made more water-proof, a small quantity of tar or linseed-oil is added to the mixture.

Articles made of the above-described artificial cork are in most cases as good as articles made of solid cork, and in many cases are superior to the same, as they are lighter, can be made of any size and of any shape, and are of equal quality throughout.

Having thus described our invention, what we claim as new, and desire to secure by Letters Patent, is—

A composition of matter formed of boiled starch and powdered or small pieces of cork, as described.

In testimony whereof we have signed our names to this specification in the presence of two subscribing witnesses.

C. GRUNZWEIG.
      PAUL HARTMANN.

Witnesses:
 C. BLATT,
 PH. TELMATS.